(12) United States Patent
Mulgaonkar et al.

(10) Patent No.: US 10,412,120 B2
(45) Date of Patent: Sep. 10, 2019

(54) COMPUTE RESOURCE CONFIGURATION AND VERIFICATION SYSTEMS AND METHODS

(71) Applicant: Cloud Raxak, Inc., Los Gatos, CA (US)

(72) Inventors: Prasanna Mulgaonkar, Saratoga, CA (US); Seshashayee Murthy, Yorktown Heights, NY (US)

(73) Assignee: Cloud Raxak, Inc., Los Gatos, CA (US)

( * ) Notice: Subject to any disclaimer, the term of this patent is extended or adjusted under 35 U.S.C. 154(b) by 44 days.

(21) Appl. No.: 15/098,245

(22) Filed: Apr. 13, 2016

(65) Prior Publication Data

US 2016/0308912 A1    Oct. 20, 2016

Related U.S. Application Data

(60) Provisional application No. 62/148,662, filed on Apr. 16, 2015, provisional application No. 62/259,005, filed on Nov. 23, 2015.

(51) Int. Cl.
*H04L 29/06*    (2006.01)
*H04L 12/24*    (2006.01)
*G06F 21/57*    (2013.01)

(52) U.S. Cl.
CPC .......... *H04L 63/205* (2013.01); *G06F 21/577* (2013.01); *H04L 41/28* (2013.01); *H04L 63/1425* (2013.01)

(58) Field of Classification Search
CPC ... H04L 63/205; H04L 63/1425; H04L 41/28; G06F 21/577
See application file for complete search history.

(56) References Cited

U.S. PATENT DOCUMENTS

| | | |
|---|---|---|
| 2004/0098472 A1 | 5/2004 | Styles et al. |
| 2005/0262101 A1 | 11/2005 | Halpern et al. |
| 2005/0262225 A1 | 11/2005 | Halpern et al. |
| 2007/0192834 A1* | 8/2007 | Song ............... H04L 63/205 726/3 |
| 2008/0178144 A1 | 7/2008 | Bazigos et al. |

(Continued)

FOREIGN PATENT DOCUMENTS

WO    WO2016168366 A1    10/2016

OTHER PUBLICATIONS

Slani Pearson et al. "Trusted Computing Platforms: TCPA Technology in Context" Published Jul. 22, 2002 (347 pages total).*

(Continued)

*Primary Examiner* — Joseph P Hirl
*Assistant Examiner* — Thomas A Gyorfi
(74) *Attorney, Agent, or Firm* — Carr & Ferrell LLP

(57) ABSTRACT

Systems and methods for compute resource configuration, verification, and remediation are provided herein. An example method includes verifying compliance of an operating system and compute assets provisioned configured within a middleware of a computing device using a pre-defined configuration profile, the compliance being determined by comparison of run-time hardware and software attributes of the compute assets to the pre-defined configuration profile comprising hardware and software requirements for the client.

21 Claims, 6 Drawing Sheets

(56) References Cited

U.S. PATENT DOCUMENTS

| | | |
|---|---|---|
| 2009/0187970 A1 | 7/2009 | Mower et al. |
| 2009/0227274 A1 | 9/2009 | Adler et al. |
| 2010/0071066 A1* | 3/2010 | Kline ........................ G06F 8/60 726/25 |
| 2013/0247136 A1* | 9/2013 | Chieu ................... G06F 21/577 726/1 |
| 2014/0040990 A1* | 2/2014 | Nguyen ................... H04L 67/34 726/4 |

OTHER PUBLICATIONS

"International Search Report" and "Written Opinion" Patent Cooperation Treaty Application No. PCT/US2016/027373, dated Jul. 26, 2016, 13 pages.

* cited by examiner

COMPUTE RESOURCE CONFIGURATION AND VERIFICATION SYSTEMS AND METHODS

CROSS REFERENCE TO RELATED APPLICATIONS

This non-provisional application claims the benefit and priority of U.S. Provisional Application Ser. No. 62/148,662, filed on Apr. 16, 2015, as well as U.S. Provisional Application Ser. No. 62/259,005, filed on Nov. 23, 2015, all of which are hereby incorporated by reference herein in their entireties, including all references and appendices cited therein as if fully set forth herein.

FIELD OF THE INVENTION

The present technology is directed to compute resource configuration, and more particularly, but not by limitation, to systems and methods that utilize analyze a run-time state of a compute resource for enforcing policy compliance, as well as selective adjustment of compute resource configurations. Some embodiments verify the run-time state using a boot-time verified state of the compute resource.

SUMMARY

According to some embodiments, the present disclosure is directed to a method for providing tamper proof configurations for run-time compute resources in a server, the method comprising: (a) configuring compute resources for a client, the compute resources comprising a boot-time state that has been verified against a hardware-based measurement stored in a signed datastore; (b) utilizing a pre-defined configuration profile for a client by the verified compute resources, the pre-defined configuration profile comprising hardware and software requirements for the client; and (c) verifying, at run-time, compliance of a run-time state of the compute resources with the pre-defined configuration profile, by a verification system validating the run-time state that comprises at least one of: (i) configuration of an operating system of the compute resources; (ii) configuration files for middleware; (iii) compute assets provisioned by the middleware; and (iv) computational assets executing on the compute assets provisioned by the middleware.

According to some embodiments, the present disclosure is directed to a method comprising: verifying compliance of an operating system and compute assets provisioned configured within a middleware of a computing device using a pre-defined configuration profile, the compliance being determined by comparison of run-time hardware and software attributes of the compute assets to the pre-defined configuration profile comprising hardware and software requirements for the client.

According to some embodiments, the present disclosure is directed to a method comprising: (a) a cloud comprising: (i) middleware comprising an operating system kernel and configurations; and (ii) compute resources provisioned by the middleware, the compute resources comprising an operating system kernel configurations and boot files; (1) a configuration and verification system that generates boot-time profiles of the operating system kernel and the boot files; and (2) a signed store that stores the boot-time profiles; (b) a cloud server that: (i) provisions the compute resources; and (ii) compares boot-time attributes of the compute resources to the boot-time profiles in the signed store to determine if the compute resources are verified; and wherein the configuration and verification system verifies, using the hardware-verified compute resources, run-time resources comprising: (1) a configuration of an operating system of the compute resources; and (2) a configuration files for middleware.

According to some embodiments, the present disclosure is directed to a method that is executed during run-time of a compute resource in a cloud network, the method comprising: (a) applying a pre-defined run-time configuration profile to hardware verified compute resources provisioned for a client by a hardware verified operating system kernel, the configuration profile comprising hardware and software requirements for the client; (b) verifying compliance with the pre-defined run-time configuration profile, by a verification system validating at least one of: (i) configuration of an operating system of the compute resources; (ii) configuration files for middleware; (iii) compute assets provisioned by the middleware; (iv) computational assets executing on the compute assets provisioned by the middleware; and (v) providing access to the compute resource if compliance is verified and denying access to the compute resource if compliance cannot be verified.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The present disclosure is directed to systems and methods that configure and verify compute resources. The systems and methods can also be utilized within cloud resources that include a virtual machine, a baremetal machine, cloud storage, routers, firewalls, and middleware that provision and configure the compute resources for a plurality of clients (or a single client). Cloud resources may include all cloud resources that can be defined in the software. As utilized herein, references made to a cloud resource can be equally be applied to a single virtual or baremetal compute resource that is not limited to a cloud or data center.

The systems and methods provided herein may comprise methods for selecting a profile further comprising rules to apply against the cloud resource. The systems and methods provided herein comprise applying the rules in the profile against the compute resource.

The systems and methods provided herein may include generating a report about the applying of the rules against the cloud resource, the report including a listing of successful and unsuccessfully applied rules. The systems and methods disclosed herein may include automatically remediate unsuccessfully applied rules to generate successfully applied rules. For example, it may be determined that password requirements are not being met, or that vulnerability scans are not being executed properly. Automatic remediation could include automatically increasing a password complexity and requesting that users select new passwords in accordance with the increased password schema.

Systems and methods provided herein may include generating an audit report. According to further exemplary embodiments, the above processes may be periodically repeated. Reports may also include information in a form that can be readily used in an audit. The remediation may be performed automatically by a rule provided with the product, or performed by a program provided externally.

With respect to compliance, it is possible to measure and set key configuration parameters of an operating system, middleware, applications, networking and other parts of a computing environment. This is true on physical and virtualized or embodiments. This enables the configuration of these assets to be compliant with a desired state specified by business needs or regulatory requirements. In these teachings, the compliance results on the operating system, and the rest of the computing environment relies on key components of the computing elements or environment to provide services necessary for the functionality. If these services are compromised, one cannot rely on the compliance results.

Hardware Assisted Boot-Time Compliance

Figure 1:
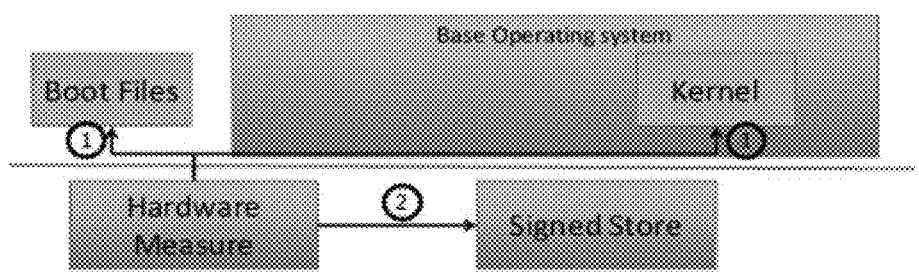
FIG. 1 is a schematic diagram of a hardware-based verification of a boot-time state of a compute resource.

FIG. 1 is a schematic diagram of a method of hardware assisted compliance. Stated otherwise, the method involves verifying a boot-time state of a compute resource. FIG. 1 illustrates how hardware in a compute resource is used as a basis to verify trustworthiness of a boot-time state of the compute resource. The boot-time state is indicative of hardware and software parameters of the compute resource at boot time. Non-limiting examples of boot-time state parameters comprise operating system attributes, OS kernel attributes, boot files, system firmware, and/or other indicative information that can be used to verify the compute resource. In some embodiments, these parameters are verified as being trustworthy at boot-time.

Prior to execution of the method in FIG. 1, a baseline boot-time state profile for the compute resource is created. This profile can be used in subsequent boot-time events or, as will be described below, during run-time events for compute resource verification. The profile can be stored in a signed store that is local to the compute resource or in a remote location In step 105, at boot time, a hardware component measures a boot-time state having parameters such as boot files and OS kernel configurations and stores the measures in the signed store.

In step 110, a server (which in some embodiments comprises a cloud infrastructure server "CIT") queries the signed store and verifies that the boot-time state measured at boot-time matches what was expected (e.g., what was stored in the signed store). This provides boot-time compliance for the OS kernel and the boot files. Again, the hardware of the compute resource is used as a basis to verify trustworthiness of key aspects of the operating system and the environment such as the OS kernel of the operating system and the boot files. In some embodiments system firmware and other compute resource configurations/states are measured. To be sure, any hardware or software attribute of the compute resource can be utilized in this process.

According to various embodiments, these compliance/verification aspects are coupled with hardware assisted compliance aspects to provide trusted compliance on a compute resource. Using these methods, the present disclosure provides for the creation of methods that produce compliance results that are based on a hardware basis of trust and are therefore more trustworthy.

Hardware Assisted Run-Time Compliance

Figure 2:
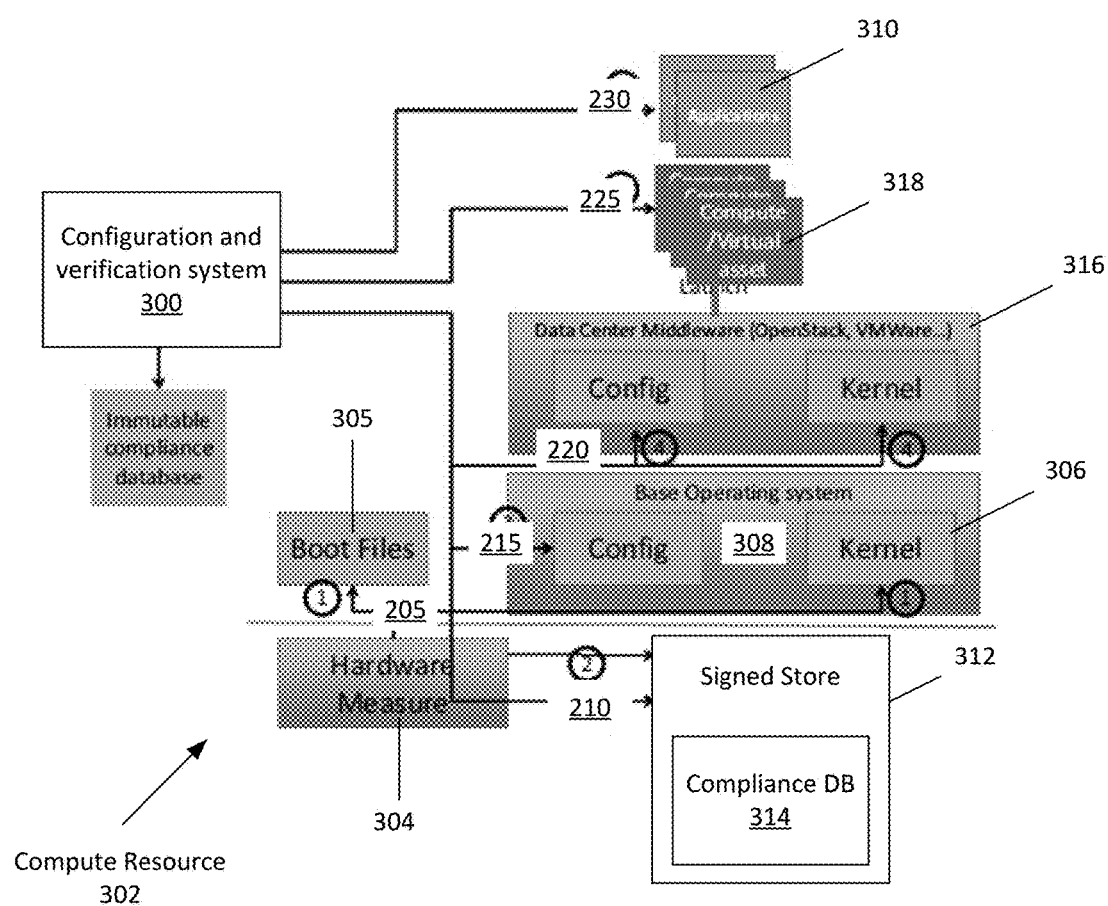
FIG. 2 is a schematic diagram of verification of a run-time state of a compute resource that has been a hardware-verified using the process illustrated in FIG. 1.

While the process of FIG. 1 illustrates a hardware-based method for verifying boot-time states of compute resources (allowing for compliance checks and remediation), FIG. 2 illustrates a method for coupling run-time state compliance to hardware-based compliance aspects. The method of FIG. 2 can be executed using a configuration and verification system 300 to configure and verify a compute resource 302.

In step 205, at boot time, a hardware measure 304, such as a CPU and/or chipset of the compute resource 302 measures boot files 305 and OS kernel 306 of a machine(s) (compute resource) on which the one or more operating systems 308 will run, and stores the measures in the signed store 310. This establishes a basis of trust (baseline boot-time state) in immutable hardware for the boot files 305 and the kernel 306. This basis of trust is then used to verify the rest of the compute resource 302 and its environment, such as applications 310.

In step 210, a configuration and verification system 300 queries the signed store 312 and verifies that a current boot-time state of the compute resource 302 matches what was expected in the boot-time profile that was previously stored in the signed store 312. If the measure matches a log entry is created in a compliance database 314 that reflects that the compute resource 302 is compliant (e.g., has a compliant boot-time state). Stated otherwise, a hardware-based level is established for trusting that kernel and the boot files have not been tampered with. If a match is not found a log entry is also recorded the compliance database 314. In some embodiments, remediation measures are determined and implemented for the compute resource 302. In some embodiments, the compute resource 302 can be flagged for review, terminated, or sandboxed for review—just to name a few examples.

In step 215, the configuration and verification system 300 queries the OS kernel 306 to verify the configuration of the operating system(s) of the machines (e.g., compute resources) on which the operating system is run. The configuration and verification system logs the compliance or findings in the compliance database.

In some embodiments, the methodology can be executed in a data center or cloud. In these embodiments, the method can be performed within the data center and applied for verification of data center services such as middleware and computational resources.

In step 220, the configuration and verification system 300 queries the configuration files for the data center middleware 316. The middleware 316 can comprise Open Stack, VMWare, CloudStack, HyperV, as well as any other middleware that would be known to one of ordinary skill in the art with the present disclosure before them. The configuration and verification system logs the compliance or findings (e.g., pass or fail) in the compliance database.

In step 225, the configuration and verification system 300 verifies the compute assets 318 provisioned by the data center middleware 316. As mentioned above, compute assets could be baremetal machines, Virtual machines, network assets, storage, as well as any other assets used in computation in a data center. The configuration and verification system logs the compliance or findings in the compliance database.

In step 230, the configuration and verification system 300 verifies any computational assets that run on the compute assets 318 provisioned in step 225. The computational assets verified could be middleware such a MySQL, JBOSS, any other middleware used in computation in the data center. The computational assets could also application software that runs directly on the middleware 316. The configuration and verification system 300 logs the compliance or findings in the compliance database 312.

The external configuration and verification system 300 can automatically remedy any findings that can be remediated by automated means.

To be sure, steps 205-230 can be applied on a near continual basis to provide continuous run-time compliance.

In the method above, the configuration and verification system 300 is able to verify both boot and run time compliance of middleware and any applications that run on these clouds using as a basis of trust immutable capabilities embedded in the silicon, such as hardware encoded capabilities of the CPU or chipset of the compute resource being verified. The resulting compliance verification for the entire application is therefore tamper proof.

Figure 3:
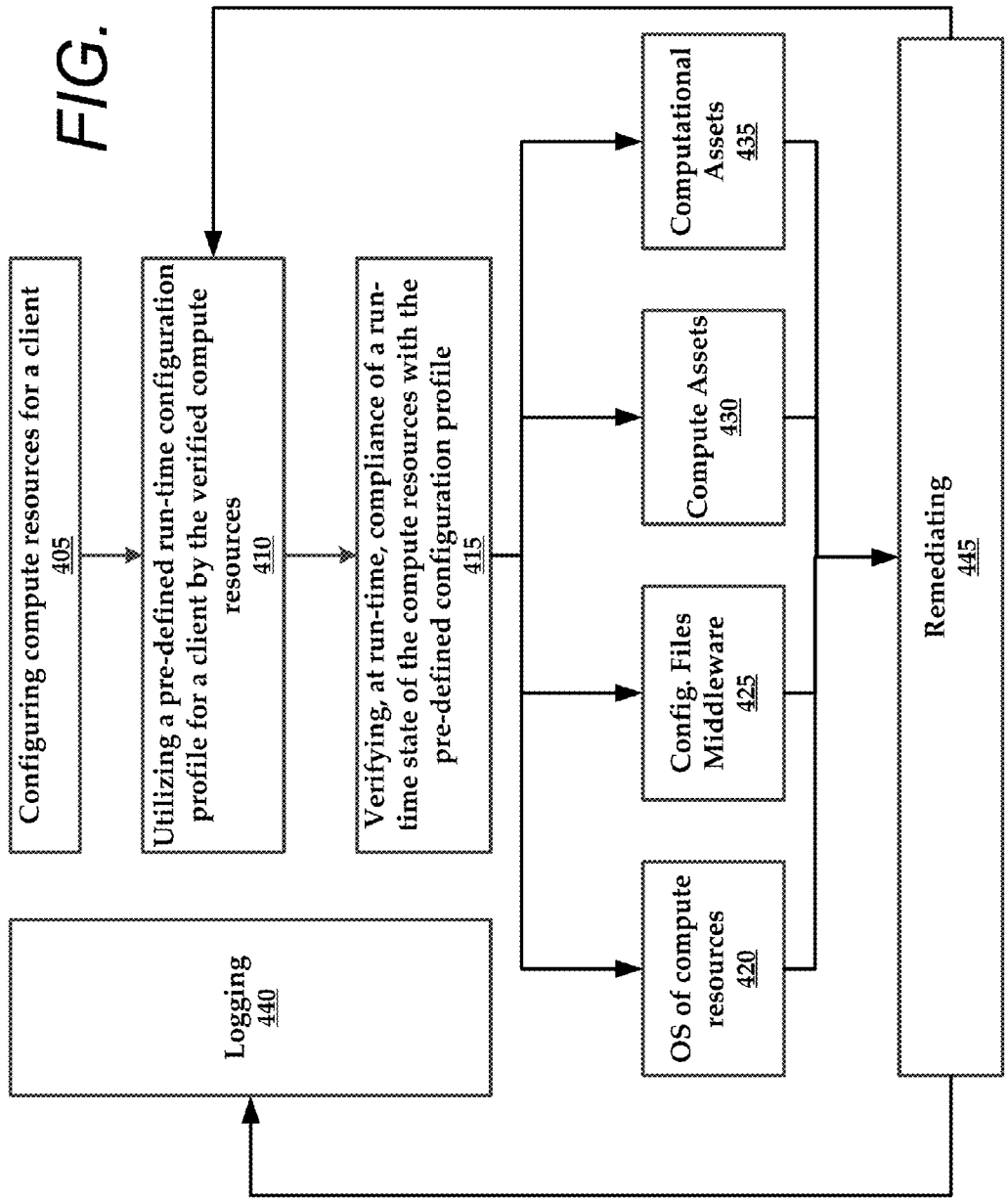
FIG. 3 is a flowchart of an example method of providing tamper proof configurations for run-time compute resources in a server.

FIG. 3 is a flowchart of an example method for configuring and verifying compute resources. The method includes a step 405 of configuring compute resources for a client. As mentioned above, the compute resources have a boot-time state that has been verified against a hardware-based measurement stored in a signed datastore. Non-limiting examples of attributes of the boot-time state include any hardware and/or software configurations that are established for the compute resource.

Next, the method comprises a step 410 of utilizing a pre-defined run-time configuration profile for a client by the verified compute resources. In some embodiments, the pre-defined configuration profile comprises hardware and software requirements for the client. These requirements can be requirements of an end user, corporate or enterprise level requirements, and/or regulations established by a regulatory body such as a local, state, or federal agency. These regulatory agencies establish requirements such as HIPAA, PCI-DSS, FFIEC, MAS, FISMA, SOX, DSS, and/or other regulatory compliance schemes. These regulatory compliance schemes impose computer security guidelines for compute resources and/or networks that handle certain types of information or service certain types of customers. The pre-defined configuration profile can include hardware and/or software configuration requirements based on any of these aforementioned requirements.

In essence, the regulation protocol will comprise hardware and software parameters that are implementable at the compute resource level such that the compute resource can be compliance with any of a federal, state, local, or corporate policy, or any combinations and permutations thereof.

Next, the method includes a step 415 of verifying, at run-time, compliance of a run-time state of the compute resources with the pre-defined configuration profile. In some embodiments, a verification system validates the run-time state that comprises at least one of configuration of an operating system of the compute resources (in step 420), configuration files for middleware (in step 425), compute assets provisioned by the middleware (in step 430), and computational assets executing on the compute assets provisioned by the middleware (in step 435).

As mentioned above, it is understood that verification as described above encompasses verifying the compute resources for the client to ensure that the compute resources have not been tampered with and that the compute resources have been provisioned so as to comply with at least one regulation protocol, in some embodiments.

In some embodiments, the method above includes a process of immutably logging 340 verification and remediation actions and their results at each the verification processes. The logging process logs successful and unsuccessful (pass/fail) verification events. As mentioned above, the logging process includes creating a log record in a compliance database.

In some embodiments, if a verification process detects a failure or inability to verify, the method includes a step of remediating 445 to bring into compliance with the pre-defined configuration profile any non-compliant portion of the compute resource. Again, this can include the boot files, the operating system kernel, the operating system kernel configurations, the configuration files for middleware, the compute assets provisioned by the middleware, and the computational assets executing on the compute assets provisioned by the middleware, and so forth.

Subsequent to each remediation, the process can return to step 410 for re-verification of compliance of the compute resource with the pre-defined run-time profile.

According to some embodiments, the method can result in the system providing access to the compute resource if compliance is verified and denying access to the compute resource if compliance cannot be verified. Denying use of the computing resource can also be a functionality of an inability to remediate a non-compliant state of the compute resource.

In addition to the verification processes described above, the present disclosure provides methods that allow for specific configurations of compute resources based on various system factors.

In some embodiments, a pre-defined configuration profile comprises a schedule that defines hardware and s similar compute assets. By way of example, in a cloud, a cloud provisioning server can be configured to measure usage rates of clients and develop compute resource allocation to clients based on historical usage. For example, if a client tends to utilize compute resources heavily on a particular day of the week, the pre-defined run-time profile of the client can be configured with a requirement that a certain application is allocated preferential access to computational resources in the middleware on the required day.

Figure 4:
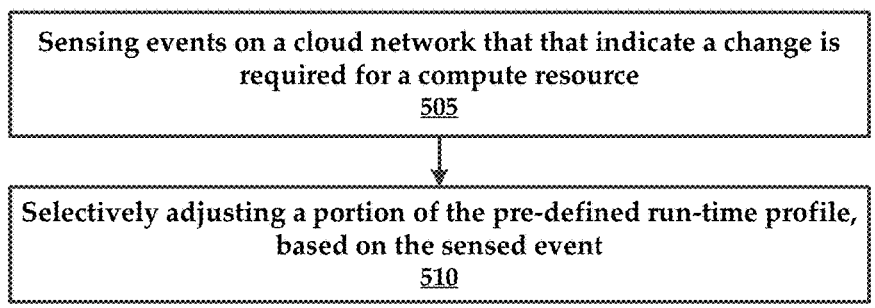
FIG. 4 is a flowchart of an example method of selectively adjusting a pre-defined run-time profile for a client based on sensed network activity.

FIG. 4 illustrates an example method that can be executed using the systems and methods of the present disclosure. The method generally describes a process of using sensed events in a network or cloud to selectively adjust run-time aspects of a compute resource within the network or cloud.

In some embodiments, the method includes a step 505 of sensing events on a cloud network that that indicate a change is required for a compute resource. In some embodiments, this change is a security related event sensed on the network, such as a cyber-attack in another client, or a sudden surge of network traffic that is indicative of potential malicious activity. Broadly, any event that indicates an actual or potential malicious act has occurred within the network (or in another network as determined by virus scanning software or other means) can be used as the basis for changing pre-defined run-time profiles for a client. For example, if a security event of a brute force password hack of another client is sensed, the cloud can utilize a configuration and verification system to automatically and selectively adjust the pre-defined run-time profiles to require an increase in password complexity. It is noteworthy that this just an example of many different events that can be sensed and remediated using a pre-defined run-time profile.

In some embodiments, the change to the pre-defined run-time profiles can comprise a change to the configuration of an operating system of the compute resources, the configuration files for middleware, the compute assets provisioned by the middleware, or the computational assets executing on the compute assets provisioned by the middleware—just to name a few.

Thus, the method could include a step 510 of selectively adjusting a portion of the pre-defined run-time profile, based on the sensed event. Examples include changes to the configuration files for the middleware, the compute assets provisioned by the middleware, or the computational assets executing on the compute assets provisioned by the middleware.

As mentioned above, the events sensed comprise security related issues with other compute resources provisioned by the cloud network, in some embodiments.

In other embodiments, events sensed comprise compute resource availability issues or bandwidth issues within the cloud network.

Figure 5:
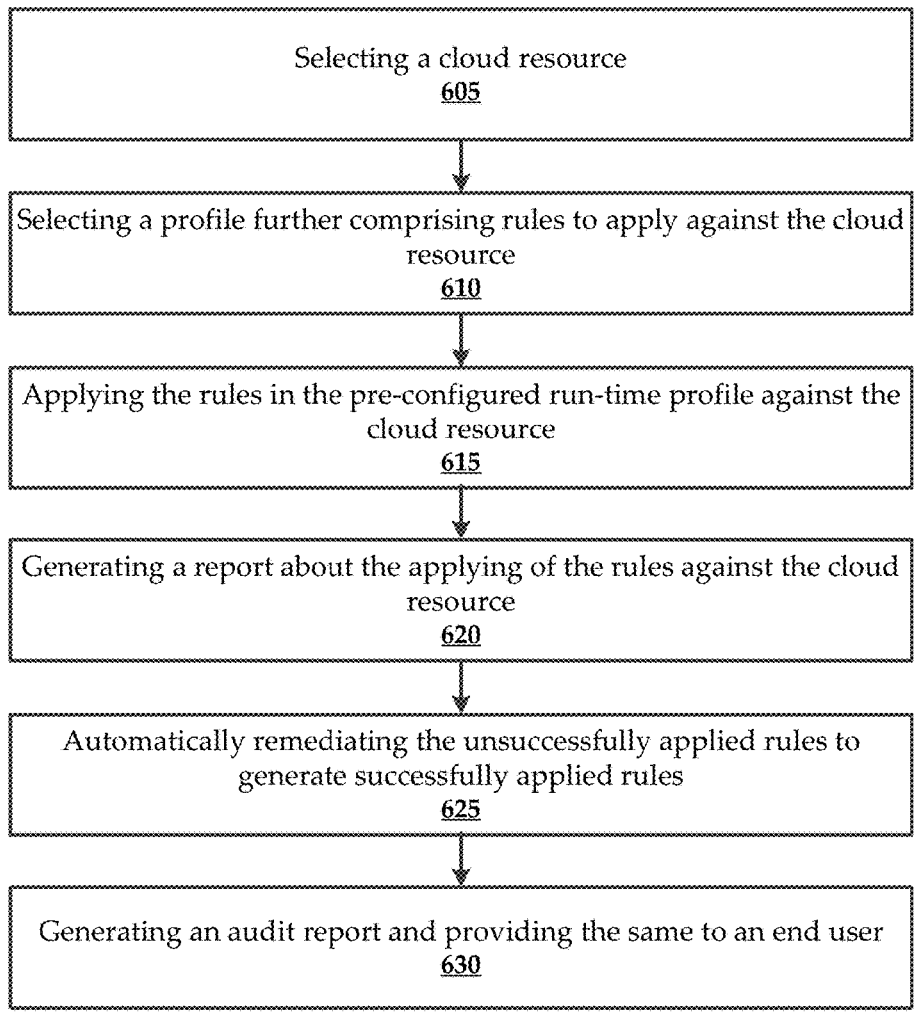
FIG. 5 is a flowchart of another example compute resource configuration and verification method.

FIG. 5 illustrates an example method of securing a cloud asset, such as a compute resource/client, in accordance with embodiments of the present disclosure. The method includes a step 605 of selecting a cloud resource. Next, the method includes a step 610 of selecting a profile further comprising rules to apply against the cloud resource. The profile comprises a pre-configured run-time profile that is based on at least one regulatory policy in some embodiments.

Next, the method comprises a step 615 of applying the rules in the pre-configured run-time profile against the cloud resource. In some embodiments, the method includes a step 620 of generating a report about the applying of the rules against the cloud resource. In some embodiments, the report includes a listing of successful and unsuccessfully applied rules.

As mentioned above, the method can include a step 625 of automatically remediating the unsuccessfully applied rules to generate successfully applied rules. The remediation can include inducing changes to any hardware or software configuration of the compute resource that can be accomplished in an automated manner.

Optionally, in some embodiments, the method includes a step 630 of generating an audit report and providing the same to an end user.

Again, the cloud resource can comprise a Virtual machine, a baremetal machine, cloud storage, routers, firewalls, middleware and other components that can be provisioned in a cloud to build an application or part thereof. This includes all cloud resources that can be defined in the software.

Non-limiting examples of rules comprise a rule to ensure that there are no world writeable files in the operating system. This rule checks every single directory recursively and finds any files that are writeable by the world. If such files exist, it reports them as a finding that is logged in a non-repudiatable log. Another rule can be implemented to check the ownership of the /etc/gshadow directory. If it is not root then it is reported as a finding. Yet another rule is used to check the permissions on /etc/gshadow directory. If it is not "—" it is reported as a finding.

In some embodiments the rules in the pre-configured run-time profile are parameterized so that the rules can be tailored to the requirements of an enterprise. For example, a rule can be tailored to state "There should be no world writeable files except for a white-list of files." The whitelist of files can consist of standard files that need to be world writeable; for example files required by SAP, Oracle, Tivoli, etc. that need to be world writeable for the software to function properly.

A method where the parameters such as whitelist of files are created by a highly privileged user such as the CISO and then incorporated into the standard profile so that developers, testers and system administrators do not have to deal with false positive findings.

The remediation is performed automatically by a rule in some embodiments. For example, a remediation is to set the ownership of /etc/gshadow to root, if not correct. Another remediation is to "chmod 000/etc/gshadow". The ownership remediation example can be performed by an external program that changes the permissions of all world writeable files. Again, these are merely non-limiting examples.

In one embodiment, a new rule is added to a pre-configured run-time profile to detect all machines with a certain problem. The pre-configured run-time profile is applied automatically to all machines and quickly finds a list of machines that are vulnerable to an exploit. In this embodiment, a new rule is added to the profile to find all machines that are vulnerable to the "shellshock" problem; or a new rule is added to the profile to find all machines vulnerable to the "heartbleed" bug.

An example remediation for the set of machines discovered in comprises a compensatory control to be applied to all machines vulnerable to the new discovered bug. The compensatory control is immediately automatically applied to all vulnerable machines thereby reducing the exposure.

Compensatory controls are required as it is not possible to immediately patch the bug. This requites downtime and this may not be possible to do immediately. The compensatory control for the heart bleed bug can comprise remediation that locks down the firewall to only enable access from known IPs and known devices, which allows the machine (e.g., compute resource) to stay in the unmatched state while application teams test the patch.

In some embodiments a systems administrator can invoke exceptions to the tickets being created. By invoking an exception the ticket does not go to the system administrator. However the problem is logged and reported to highly privileged individuals like the CISO. By way of example, an exception can be invoked to prevent errors in compliance with world writeable files from being reported. This may be because the sysadmin knows that these files are required by an application. This prevents false positives. However the findings are logged and reported to the highly privileged person.

Figure 6:
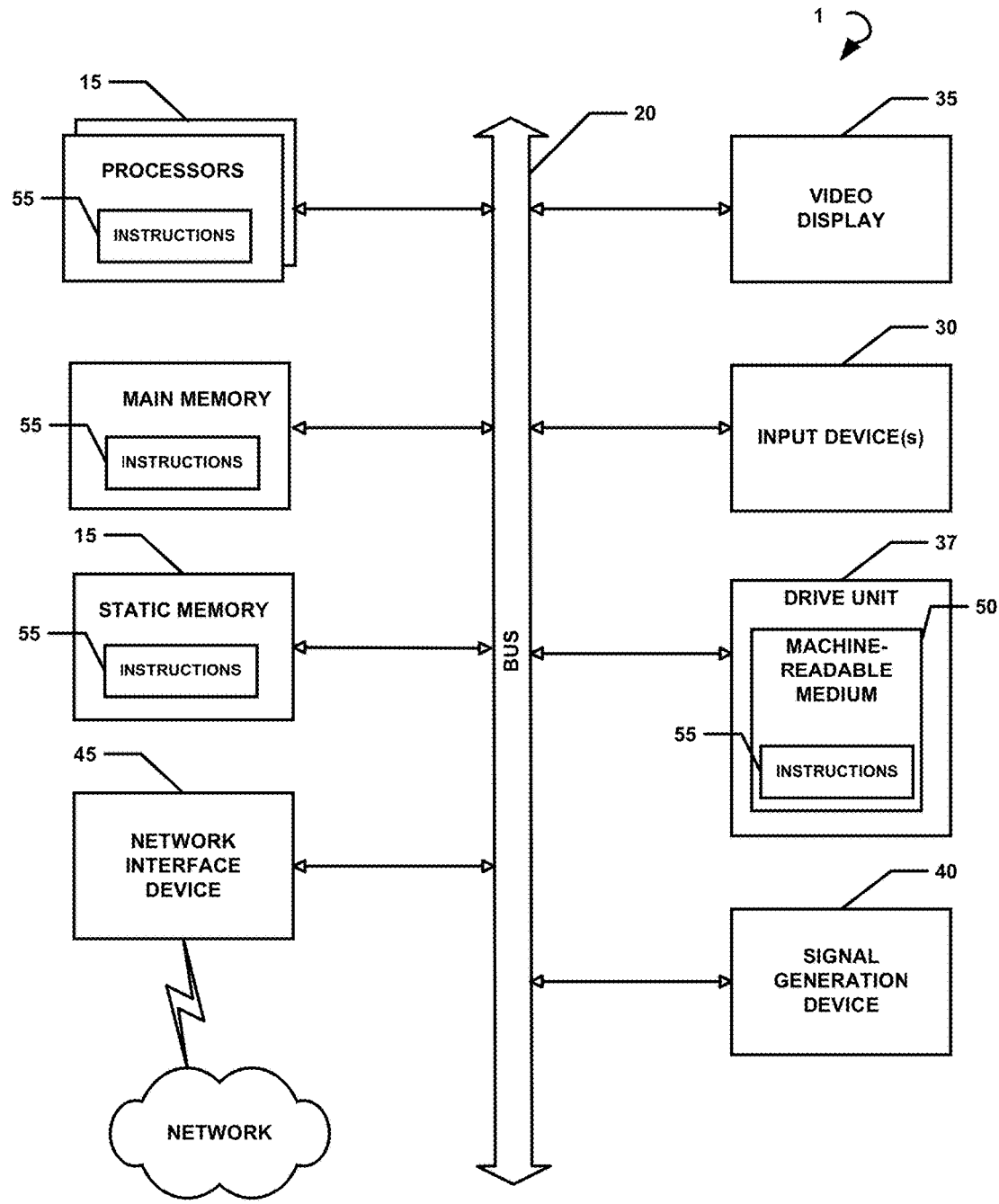
FIG. 6 is a schematic diagram of an example computer device that can be utilized to implement aspects of the present technology.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference throughout this specification to "one embodiment" or "an embodiment" means that a particular feature, structure, or characteristic described in connection with the embodiment is included in at least one embodiment of the present invention. Thus, the appearances of the phrases in "one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure. For example, the technology is not limited to use for stopping email threats, but applies to any messaging threats including email, social media, instant messaging, and chat.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for providing tamper proof configurations for run-time compute resources in a server, the method comprising:
    configuring compute resources for a client, the compute resources comprising a boot-time state that has been verified against a hardware-based measurement stored in a signed datastore;
    utilizing a pre-defined configuration profile for a client by the verified compute resources, the pre-defined configuration profile comprising hardware and software requirements for the client; and
    verifying, at run-time, compliance of a run-time state of the compute resources with the pre-defined configuration profile, by a verification system validating the run-time state that comprises:
    configuration of an operating system of the compute resources;
    configuration files for middleware;
    compute assets provisioned by the middleware;
    computational assets executing on the compute assets provisioned by the middleware; and
        the middleware comprising an operating system kernel and configurations, and compute resources boot files.

2. The method according to claim 1, wherein verifying comprises verifying the compute resources for the client to ensure that the compute resources have not been tampered with and that the compute resources have been provisioned so as to comply with at least one regulation protocol.

3. The method according to claim 1, wherein the boot-time state comprises any of boot files, system firmware, an operating system kernel, BIOS, and operating system kernel configurations.

4. The method according to claim 3, wherein if any verification fails, remediating to bring into compliance with the pre-defined configuration profile any of the boot files, the operating system kernel, the operating system kernel configurations, the configuration files for the middleware, the compute assets provisioned by the middleware, and the computational assets executing on the compute assets provisioned by the middleware.

5. The method according to claim 1, further comprising immutably logging all verification and remediation actions and their results during verifying.

6. A method, comprising: verifying compliance of an operating system and compute assets provisioned by middleware of a computing device using a pre-defined configuration profile, the compliance being determined by comparison of run-time hardware and software attributes of the compute assets to the pre-defined configuration profile comprising hardware and software requirements for a client;
validating;
configuration files for the middleware;
compute assets provisioned by the middleware;
computational assets executing on the compute assets provisioned by the middleware; and
the middleware comprising an operating system kernel and configurations, and compute resources boot files.

7. The method according to claim 6, wherein compliance of a boot-time state of the operating system is verified at boot time by evaluating an operating system kernel, boot files, system firmware and operating system configurations relative to a hardware measurement stored in a signed datastore.

8. The method according to claim 6, wherein the pre-defined configuration profile is created relative to a regulation protocol that is based on any of HIPAA, PCI-DSS, FFIEC, MAS, FISMA, or combinations thereof.

9. The method according to claim 7, further comprising:
establishing a hardware-based measurement for the compute resources; and
comparing the boot-time state of the operating system kernel and the boot files for the compute assets to the hardware-based measurement in the signed datastore.

10. The method according to claim 9, further comprising:
executing a remediation if:
the comparison indicates that the operating system kernel or the boot files for the compute assets do not comply with the hardware-based measurement; and
the comparison of run-time hardware and software attributes of the compute assets to the pre-defined configuration profile fails.

11. A system, comprising:
a cloud comprising:
middleware comprising an operating system kernel and configurations;
compute resources provisioned by the middleware, the compute resources comprising an operating system kernel and configurations, and boot files;
a configuration and verification system that generates boot-time profiles of the operating system kernel and the boot files;
a signed store that stores the boot-time profiles;
a cloud server that:
provisions the compute resources; and
compares boot-time attributes of the compute resources to the boot-time profiles in the signed store to determine if the compute resources are verified; and
wherein the configuration and verification system verifies, using the hardware-verified compute resources, run-time resources comprising:
a configuration of an operating system of the compute resources; and
configuration files for the middleware.

12. The system according to claim 11, wherein if the configuration and verification system determines that at least one of the operating system kernel configurations, system firmware, and boot files do not match any of the boot-time profiles, the configuration and verification system generates a log.

13. The system according to claim 11, wherein the configuration and verification system immutably logs any of the verifying of measures, the verifying of the operating system kernel, the configuration files, system firmware, the compute assets, and computational assets.

14. The system according to claim 11, wherein the configuration and verification system is further configured to verify:
compute assets provisioned by the middleware; and
computational assets executing on the compute assets provisioned by the middleware.

15. A method executing during run-time of a compute resource in a cloud network, the method comprising:
applying a pre-defined run-time configuration profile to hardware verified compute resources provisioned for a client by a hardware verified operating system kernel, the pre-defined configuration profile comprising hardware and software requirements for the client;
verifying compliance with the pre-defined run-time configuration profile, by a verification system validating:
configuration of an operating system of the compute resources;
configuration files for middleware;
compute assets provisioned by the middleware; and
computational assets executing on the compute assets provisioned by the middleware; and
providing access to the compute resource if compliance is verified and denying access to the compute resource if compliance cannot be verified.

16. The method according to claim 15, wherein the pre-defined configuration profile comprises a schedule that defines hardware and software attributes of the compute assets required based on historical client usage rates for compute assets.

17. The method according to claim 15, further comprising:
sensing events on the cloud network that that indicate a change to any of the configuration of an operating system of the compute resources, the configuration files for middleware, the compute assets provisioned by the middleware, or the computational assets executing on the compute assets provisioned by the middleware; and
selectively adjusting any of the configuration files for the middleware, the compute assets provisioned by the middleware, or the computational assets executing on the compute assets provisioned by the middleware based on the events sensed.

18. The method according to claim 17, wherein the events sensed comprise security related issues with other compute resources provisioned by the cloud network.

19. The method according to claim 17, wherein the events sensed comprise compute resource availability issues or bandwidth issues within the cloud network.

20. The method according to claim 15, wherein the hardware verified compute resources comprise a compute resource having a boot-time state that comprises hardware attributes and software attributes that have been verified using hardware-based measurements of hardware of the compute resource.

21. The method according to claim 20, wherein a regulation protocol comprises hardware and software parameters that are implementable at a compute resource level such that the compute resource can be in compliance with any of a federal, state, local, or corporate policy.

\* \* \* \* \*